Dec. 12, 1961 R. BATAILLE 3,013,165
ELECTRIC PULSE-GENERATOR SYSTEMS
Filed July 18, 1958 2 Sheets-Sheet 1
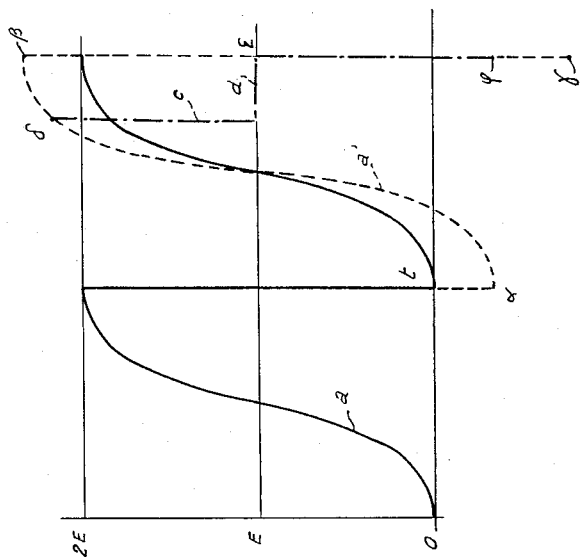
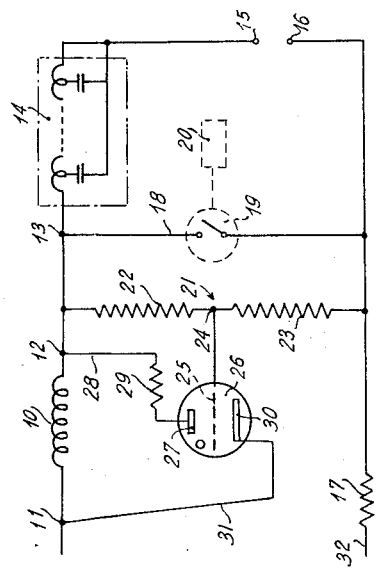
INVENTOR:
Roger Bataille
BY Karl F. Ross
Agent Dec. 12, 1961   R. BATAILLE   3,013,165
ELECTRIC PULSE-GENERATOR SYSTEMS
Filed July 18, 1958   2 Sheets-Sheet 2

INVENTOR:
Roger Bataille
BY Karl F. Ross
Agent

United States Patent Office 3,013,165
Patented Dec. 12, 1961

3,013,165
ELECTRIC PULSE-GENERATOR SYSTEMS
Roger Bataille, 18 Ave. de la Lauziere, Asnieres, France
Filed July 18, 1958, Ser. No. 749,437
Claims priority, application France Mar. 28, 1958
12 Claims. (Cl. 307—108)

This invention relates to improvements in electric pulse-generating systems and is especially applicable to modulators as used in radar transmission.

Such a modulator usually comprises a charging inductance permanently connected to a source of high-voltage direct current and followed by an energy-storage circuit of the type sometimes called a pulse-forming network in the form of an artificial line comprising a plurality of capacitances and inductances, an electronic switch being provided for cyclically producing a sudden discharge in said network under control of a pre-modulator, so that energy stored in said network over a relatively long period is applied within a very short time to the circuit connected to a load which thus receives a high-intensity pulse.

If the artificial line has a capacitive input impedance, application of a constant voltage to it in series with the charging inductance will result in the flow of a sinusoidal charging current whose frequency is determined by the resonance between this inductance and the input capacitance of the line. With the electronic switch operated by a suitable timing circuit at a rate equaling twice this frequency, the line will be discharged periodically through the load whose impedance should match the characteristic impedance of this line in order that the discharge may proceed aperiodically. Under these circumstances the voltage existing across the line/load combination just prior to discharge will be 2E where E is the voltage of the direct-current source.

With some types of load, such as magnetrons, the desired impedance match cannot be maintained under all operating conditions. As the load impedance drops, however, the discharge begins to take the form of a damped oscillation whose amplitude assumes a negative value before the unidirectional electronic switch (e.g. a thyratron) ceases to conduct. Since the next cycle starts with an effective D.-C. voltage greater than E, the voltage stored in the pulse-forming network before discharge will exceed the normal maximum of 2E whereby, with continuing impedance mismatch, potentials of a magnitude as much as two or three times the rated value will appear on the line.

Prior attempts at minimizing this voltage rise, either through the use of a diode shunted across the pulse-forming network or by means of a voltage-sensitive two-terminal element (thermistor or thyrite) bridged across the charging inductance, have not been satisfactory. The dissipation of negative voltages through unidirectionally conductive diodes requires generally a rather bulky array of such diodes having the necessary current-carrying capacity, whereas the bridging of the charging inductance by a continuously conductive impedance element poses special design problems to minimize the drain during normal operation while insuring adequate shunting of that inductance under excess-voltage conditions.

It is an object of this invention to provide a protective device for a radar modulator or similar pulse generator which will avoid the above difficulties and which, specifically, will have extremely low weight and size.

Another object is to provide a device of this type applicable to all modulators without requiring special matching to be performed in every case.

Still another object is to provide a device of this type incorporating the use of components that are more or less standard in conventional radar modulator equipment.

A further object is to provide a device of this type which will be highly reliable in operation.

According to the invention, there is connected in parallel with all or part of the charging inductance a circuit element which has a practically infinite resistance so long as the output voltage of said inductance has not exceeded a predetermined threshold value, and which will then suddenly drop to a very low resistance value on the output voltage reaching said threshold value.

The invention, in a specific embodiment, utilizes a gas discharge tube or the like having its control grid carried to a potential corresponding to the output voltage of the charging inductance, and having another of its electrodes carried to the potential of the supply source, the control-grid potential reaching a value at least equal to the value of the source voltage when the output voltage from the charging inductance reaches a value at least equal to said predetermined value.

The control-grid potential is preferably derived from a voltage divider connected between the charging-inductance output and a point of fixed potential. In the aforementioned case where the threshold value is twice the source voltage, the grid of the tube can be connected to the midpoint of a resistance interposed between the charging-inductance output and the fixed-potential point. A conventional peak voltmeter may form part of this voltage divider.

In the ensuing exemplary description reference will be made to the accompanying drawing, wherein:

FIG. 1 is a circuit diagram of an improved system according to the invention;

FIG. 2 is an explanatory graph;

Figure 3:
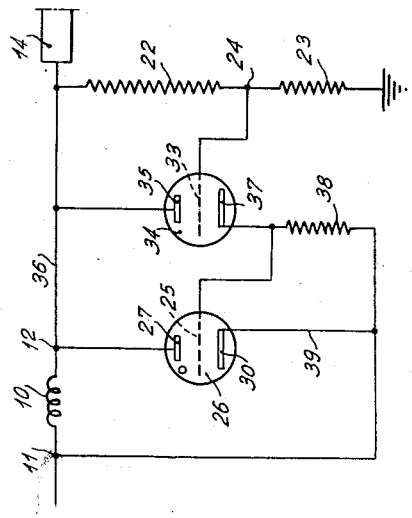
FIG. 3 is a partial circuit diagram of a modified system according to the invention.

The radar modulator shown in FIG. 1 comprises a charging inductance 10 having one end 11 connected to one terminal of a high-voltage source of direct-current and having its other end 12 connected to the input terminal 13 of the pulse forming network 14. Thus pulse-forming network comprises, as is known per se, an artificial line composed of a plurality of capacitances and inductances, the output of the modulator being capacitances impressed upon the terminals 15 and 16; terminal 15 is connected to circuit 14 and terminal 16 is connected to the other source terminal through a resistance 17 serving to trigger a circuit breaker in the usual manner. Connected across terminals 13 and 16 is the circuit 18 of a switch 19 adapted to open and close in accordance with the desired repetition frequency under control of a pre-modulator 20. If E is the value of the supply voltage, application of this voltage to the charging inductance 10 causes an increasing voltage to appear on the input terminal 13 of circuit 14 which under normal conditions, that is when the load impedance Z connected across the terminals 15 and 16 equals the impedance of circuit 14, has a maximum value equal to or closely approximating 2E. Closure of the switch 19 applies to the load impedance within a very brief period all of the energy stored during the preceding charging step. Should for any reason the impedance Z vary in value, the voltage at the input terminal 13 of circuit 14, instead of returning to zero value, would assume a negative value, whereupon at the next operation of switch 19 the supply source of voltage E would bring input terminal 13 to a voltage greater than 2E, and the progressive build-up of this effect would inordinately increase the voltage to which the elements of circuit 14 are subjected and would be liable to damage or destroy these elements. According to the invention, a voltage divider 21 is connected between the input terminal of circuit 14 and a point of reference potential, e.g. output terminal 16 connected via resistance 17 to the low-voltage lead 32 of the direct-current source. This voltage divider may simply consist of the pair of resistances 22 and 23, with the common junction 24 of these resistances connected to the control grid 25 of a low-power thyratron or similar gas discharge tube 26 having its other two electrodes respectively connected to the input end and the output end of the charging inductance 10; plate 27 is connected to the output terminal 12 by way of a circuit 28 including a small resistance 29 therein, whereas cathode 30 is connected to the input terminal 11 through lead 31. When the potential developed at the input terminal 13 of circuit 14 is, normally, twice the potential applied to the input end 11 of inductance 10, the point 24 is selected as the midpoint of the divider circuit 21. Under these conditions, so long as the impedance Z does not depart from its normal value, the potential on point 24 applied to the control grid 25 will remain lower than or equal to that of cathode 30, so that no current flows through the gas discharge tube 26.

In the graph shown in FIG. 2, the potential variations at the input terminal 13 of circuit 14 are plotted against time. In normal operating conditions said potential starts from zero and reaches a value 2E as a sinusoidal function of time as shown by the full-line curve $a$. At time $t$ switch 19 closes and the potential at the input terminal 13 practically instantaneously drops down to zero value. Should the load impedance depart from its normal value, closure of switch 19 instead of returning the input potential to zero would bring it to some negative value as indicated by the point $\alpha$, so that at the next opening of the switch 19 the potential at point 13 will vary along the curve $a'$ shown in broken lines. In the absence of a protective device, it would reach a value such as indicated at $\beta$, greater than 2E. On closure of switch 19, the potential at terminal 13 would assume a value $\gamma$, even more negative than $\alpha$, so that the elements of circuit 14 would thus be subjected to increasingly high voltages, and in any case to voltages much higher than the nominal voltage 2E with which they were meant to be used. However, with the device of the invention, as soon as the potential of point 13 exceeds the value 2E along the curve $a'$, the potential at point 24 (FIG. 1) exceeds the value E and the gas discharge tube 26 fires, thus substantially short-circuiting the terminals of the charging inductance 10. The potential at the input terminal 13 suddenly drops to the value E which is the potential of point 11, vertically as shown at $c$, and remains at this value, along the horizontal line $d$, up to the instant $e$ at which the periodically operated switch 19 closes. The discharge caused by closure of the switch thus changes the input potential of circuit 14 from its maximum value, which is the ordinate of point $\delta$ and is very little greater than 2E, to a value represented by the ordinate of point $\varphi$ substantially equal to that of point $\alpha$. The same occurs at the next cycle, with the protecting device limiting the voltage to a maximum value substantially equal to 2E, and so on repeatedly.

The energy consumed by the protection device of the invention is very low owing to the connection of the gas discharge tube across an inductance, so that tube 26 can be a very-low-power tube and resistance 29 likewise may be quite small since its only purpose is to protect the gas tube; as a matter of fact this resistance may be omitted.

The invention further contemplates controlling the gas discharge tube, especially in cases where the voltage-divider resistances are large, by way of an intermediate stage, desirably a cathode-follower triode stage. Such a construction is shown in FIG. 3. In this circuit the midpoint 24 of resistances 22 and 23 is connected to the grid 33 of a triode 34 having its anode 35 tied to the lead 36 which extends between the charging impedance 10 and the network 14. The potential of cathode 37 of triode 34 follows the potential of grid 33 and is applied to the control grid 25 of thyratron 26 whose plate 27 is directly connected to the output terminal 12 of the charging inductance 10, a resistance 38 being connected in the circuit 39 between grid 25 and cathode 30 which is connected to the input terminal 11 of impedance 10. This provides a positive control for the protective device 26.

Figure 4:
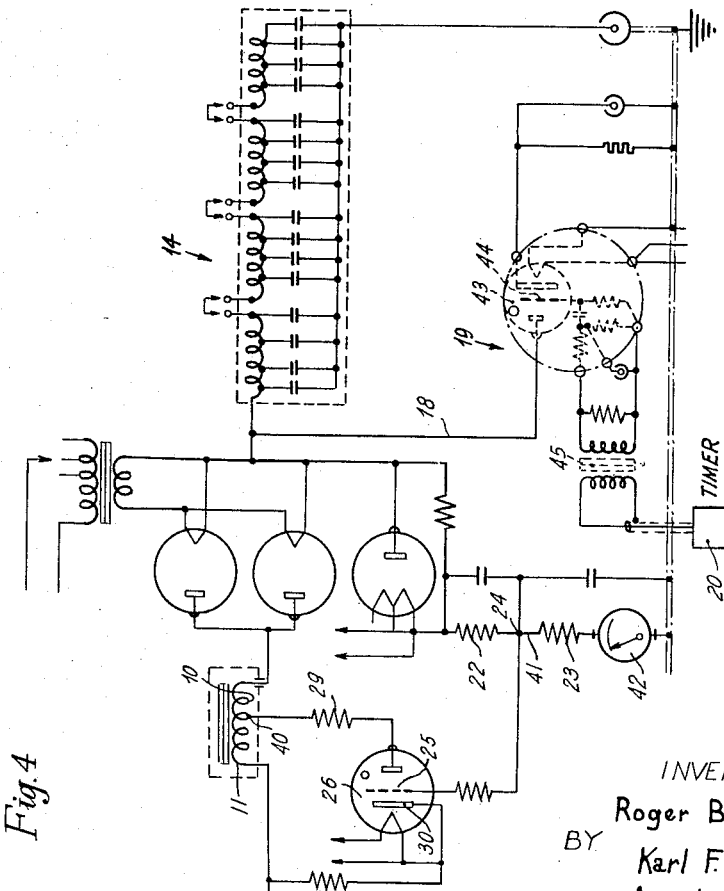
FIG. 4 is a detailed circuit diagram of a more elaborate embodiment.

FIG. 4 illustrates a more detailed circuit diagram of a system generally similar to that of FIG. 1. The protective thyratron 26 is here connected between the input end 11 of charging inductance 10 and an intermediate point 40 of the inductance. In other respects the operation is the same as that described previously. The resistances 22 and 23 form part of a circuit 41 comprising, in series with them, a galvanometer 42 which operates as a peak voltmeter. The switch 19 comprises a thyratron 43 having its grid 44 controlled through a transformer 45 from the pre-modulator unit or timing-pulse generator 20.

What I claim is:

1. An electric pulse generator for the periodic energization of a load, comprising an artificial line, a charging inductance, a charging circuit serially including said inductance, said line, said load and a source of constant voltage, switch means bridged across the series combination of said line and said load, timer means for periodically closing said switch means at a rate equal to substantially twice the resonance frequency of said charging circuit, a normally non-conductive protective device bridged across at least a portion of said inductance, and circuit means connected to the junction between said line and said inductance for momentarily rendering said device conductive upon the potential of said junction attaining a predetermined threshold value.

2. An electric pulse generator for the periodic energization of a load, comprising an artificial line, a charging inductance, a charging circuit serially including said inductance, said line, said load and a source of constant voltage, a normally non-conductive electronic switch bridged across the series combination of said line and said load, modulator means adapted periodically to render said switch unidirectionally conductive for a period which is short compared with the resonance frequency of said charging circuit and at a rate equal to substantially twice said frequency, a normally non-conductive protective device bridged across at least a portion of said inductance, and circuit means connected to the junction between said line and said inductance for momentarily rendering said device conductive upon the potential of said junction attaining a predetermined threshold value.

3. An electric pulse generator for the periodic energization of a load, comprising an artificial line, a charging inductance, a charging circuit serially including said inductance, said line, said load and a source of constant voltage, a normally non-conductive electronic switch bridged across the series combination of said line and said load, modulator means adapted periodically to render said switch unidirectionally conductive for a period which is short compared with the resonance frequency of said charging circuit and at a rate equal to substantially twice said frequency, a normally non-conductive protective device bridged across at least a portion of said inductance, and circuit means connected in parallel with said electronic switch for developing a potential proportional to the voltage across said switch, said device being provided with a control electrode connected to a point of said circuit means for rendering said device momentarily conductive upon the potential of said point attaining a predetermined threshold value.

4. An electric pulse generator for the periodic energization of a load, comprising an artificial line, a charging inductance, a charging circuit serially including said inductance, said line, said load and a source of constant voltage, switch means bridged across the series combination of said line and said load, timer means for periodically closing said switch means at a rate equal to substantially twice the resonance frequency of said charging circuit, a normally non-conductive protective device bridged across at least a portion of said inductance, and voltage-divider means connected in parallel with said switch means, said device being provided with a control electrode connected to a tap on said voltage-divider means for rendering said device momentarily conductive upon the voltage across said switch means attaining a predetermined threshold value greater than twice the voltage of said source.

5. An electric pulse generator for the periodic energization of a load, comprising an artificial line, a charging inductance, a charging circuit serially including said inductance, said line, said load and a source of constant voltage, switch means bridged across the series combination of said line and said load, timer means for periodically closing said switch means at a rate equal to substantially twice the resonance frequency of said charging circuit, a normally non-conductive thyratron bridged across at least a portion of said inductance, and voltage-divider means connected in parallel with said switch means, said thyratron being provided with a control electrode connected to a tap on said voltage-divider means for rendering said thyratron momentarily conductive upon the voltage across said switch means attaining a predetermined threshold value greater than twice the voltage of said source.

6. An electric pulse generator for the periodic energization of a load, comprising an artificial line, a charging inductance, a charging circuit serially including said inductance, said line, said load and a source of constant voltage, a normally non-conductive electronic switch bridged across the series combination of said line and said load, modulator means adapted periodically to render said switch unidirectionally conductive for a period which is short compared with the resonance frequency of said charging circuit and at a rate equal to substantially twice said frequency, a normally non-conductive protective device bridged across at least a portion of said inductance, and voltage-divider means connected in parallel with said switch, said device being provided with a control electrode connected to a tap on said voltage-divider means for rendering said device momentarily conductive upon the voltage across said switch attaining a predetermined threshold value greater than twice the voltage of said source.

7. An electric pulse generator for the periodic energization of a load, comprising an artificial line, a charging inductance, a charging circuit serially including said inductance, said line, said load and a source of constant voltage, a normally non-conductive electronic switch bridged across the series combination of said line and said load, modulator means adapted periodically to render said switch unidirectionally conductive for a period which is short compared with the resonance frequency of said charging circuit and at a rate equal to substantially twice said frequency, a normally non-conductive thyratron bridged across at least a portion of said inductance, and voltage-divider means connected in parallel with said switch, said thyratron being provided with a control electrode connected to a tap on said voltage-divider means for rendering said thyratron momentarily conductive upon the voltage across said switch means attaining a predetermined threshold value greater than twice the voltage of said source.

8. An electric pulse generator for the periodic energization of a load, comprising an artificial line, a charging inductance, a charging circuit serially including said inductance, said line, said load and a source of constant voltage, switch means bridged across the series combination of said line and said load, timer means for periodically closing said switch means, voltage-divider means connected in parallel with said switch means, and a normally non-conductive gas discharge tube having a plate-cathode circuit bridged across at least a portion of said inductance, said tube having a control grid connected to a tap on said voltage-divider means for rendering said tube momentarily conductive upon the voltage across said switch means attaining a predetermined threshold value.

9. A pulse generator according to claim 8 wherein said voltage-divider means comprises resistance means and galvanometric means in series with said resistance means.

10. An electric pulse generator for the periodic energization of a load, comprising an artificial line, a charging inductance, a charging circuit serially including said inductance, said line, said load and a source of constant voltage, normally non-conductive electronic switch means bridged across the series combination of said line and said load, modulator means adapted periodically to render said switch means unidirectionally conductive for a period which is short compared with the resonance frequency of said charging circuit and at a rate equal to substantially twice said frequency, voltage-divider means connected in parallel with said switch means, and a normally non-conductive gas discharge tube having a plate-cathode circuit bridged across at least a portion of said inductance, said tube having a control grid connected to a tap on said voltage-divider means for rendering said tube momentarily conductive upon the voltage across said switch means attaining a predetermined threshold value greater than twice the voltage of said source.

11. A pulse generator according to claim 10 wherein the connection between said control grid and said tap includes a cathode-follower tube.

12. An electric pulse generator for the periodic energization of a load, comprising an artificial line, a charging inductance, a charging circuit serially including said inductance, said line, said load and a source of constant voltage, normally non-conductive electronic switch means bridged across the series combination of said line and said load, modulator means adapted periodically to render said switch means unidirectionally conductive for a period which is short compared with the resonance frequency of said charging circuit and at a rate equal to substantially twice said frequency, voltage-divider means connected in parallel with said switch means, and a normally non-conductive gas discharge tube having a plate-cathode circuit bridged across at least a portion of said inductance, said tube having a control grid connected to substantially the midpoint on said voltage-divider means whereby said tube is momentarily rendered conductive upon the voltage across said switch means attaining a value greater than twice the voltage of said source.

References Cited in the file of this patent

UNITED STATES PATENTS

| | | |
|---|---|---|
| 2,054,496 | Craig | Sept. 15, 1936 |
| 2,405,070 | Tonks et al. | July 30, 1946 |
| 2,464,279 | Zarem et al. | Mar. 15, 1949 |
| 2,514,413 | Pawley | July 11, 1950 |